United States Patent Office 3,011,000
Patented Nov. 28, 1961

---

3,011,000
PHOSPHORUS COMPOUNDS
Albert Y. Garner, Springfield, Mass., assignor to Monsanto Chemical Company, St. Louis, Mo., a corporation of Delaware
No Drawing. Original application May 15, 1959, Ser. No. 813,327. Divided and this application May 20, 1960, Ser. No. 30,446
4 Claims. (Cl. 260—606.5)

This invention relates to novel phosphorus compounds. More particularly, it relates to novel ethylenically unsaturated secondary phosphine compounds. This application is a division of patent application S.N. 813,327, filed May 15, 1959, now abandoned.

The technology of phosphorus polymers has heretofore remained relatively undeveloped. However, phosphorus polymers are growing increasingly attractive for use in specialized applications wherein their novel properties may be advantageously utilized.

It is an object of this invention to provide novel phosphorus compounds.

Another object is the provision of novel secondary phosphine compounds containing ethylenic unsaturation and a process for their manufacture.

A further object is the provision of a new class of polymerizable phosphorus monomers.

These and other objects are attained by reacting substantially equimolar proportions of an alkali metal salt of a primary organophosphine and an ethylenically unsaturated organic halide as hereinafter described in a substantially oxygen-free reaction system wherein at least one of the reactants is dissolved in an inert solvent.

The following examples are given in illustration of the invention and are not intended as limitations thereon. Where parts are mentioned they are parts by weight.

Example I

Thirteen parts (about 0.1 mol) of sodio-phenylphosphine are slurried in 75 ml. of absolute ether in a stirred reactor equipped with a reflux condenser. The mixture is placed under a nitrogen atmosphere and a solution of 11 parts (about 0.1 mol) of 2-chloroethyl vinyl ether dissolved in 50 ml. of absolute ether is slowly charged to the reactor. The reaction is started at about room temperature, but the heat of reaction raises the temperature of the reaction system to reflux (circa 35° C.) and the ether is distilled off, using an external source of heat to drive off any residual ether present after the reaction ceases. The remaining fluid is vacuum distilled to purify the product which is a colorless liquid containing about 17.3% of combined phosphorus by weight. Infrared analysis reveals absorption characteristic of ethylenic unsaturation as well as of ether linkages and of phosphorus-phenyl and phosphorus-hydrogen linkages, indicating the product to be 2-(phenylphosphino)ethyl vinyl ether.

Example II

Ten parts (about 0.1 mol) of lithio-secondarybutylphosphine are slurried in 50 ml. of toluene in a stirred reactor. This mixture is placed under a nitrogen atmosphere and a solution of 16 parts (about 0.1 mol) of 4-chloro-n-butyl isopropenyl ether dissolved in 75 ml. of toluene is slowly charged to the reactor. The reaction is started at about room temperature, but the heat of reaction raises the temperature of the reaction system to about 50° C. After all of the 4-chloro-n-butyl isopropenyl ether solution has ben charged, the toluene is removed by distillation under a nitrogen atmosphere. The remaining fluid is vacuum distilled to purify the product which is a liquid containing about 14.9% of combined phosphorus by weight. Infrared analysis reveals absorption characteristic of ethylenic unsaturation as well as of phosphorus-hydrogen and of ether linkages, indicating the product to be 4-(secondarybutylphosphino)-n-butyl isopropenyl ether.

The ethylenically unsaturated organic halides employed in the practice of this invention are omega-halogenated-alkyl-vinylidene ethers corresponding to the general formula:

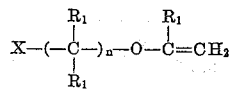

In this formula, $n$ is an integer of from 1–6, X is either bromine, chlorine or iodine and each $R_1$ may be, independently, either a hydrogen, a methyl or a phenyl radical.

Therefore, the 2-chlorothyl vinyl ether and the 4-chloro-n-butyl isopropenyl ether employed in the examples may be replaced, for example, with one of the following omega-halogenated-alkyl-vinylidene ethers with equivalent results: vinyl ethers such as chloromethyl vinyl ether, 2-bromoethyl vinyl ether, 3-chloro-n-propyl vinyl ether, 4-iodo-n-butyl vinyl ether, 5-bromo-n-pentyl vinyl ether, 6-chloro-n-hexyl vinyl ether, 1-chloroethyl vinyl ether, 2-bromo-isopropyl vinyl ether, phenyl-bromomethyl vinyl ether, 1-chloro-1-phenyl-methyl vinyl ether, 1-methyl-2-bromo-ethyl vinyl ether, 2-chloro-n-propyl vinyl ether, 2-bromo-2-phenyl-ethyl vinyl ether, 2-methyl-3-chloro-n-propyl vinyl ether, 4-bromo-4-phenyl-n-butyl vinyl ether, 2,4-dimethyl-4-chloro-n-pentyl vinyl ether, etc.; isopropenyl ethers such as bromomethyl isopropenyl ether, 2-chloroethyl isopropenyl ether, 3-iodo-n-propyl isopropenyl ether, 4-bromo-n-butyl isopropenyl ether, 5-chloro-n-pentyl isopropenyl ether, 6-iodo-n-hexyl isopropenyl ether, 1-bromoethyl isopropenyl ether, 2-chloro-isopropyl isopropenyl ether, 1-phenyl-3-chloro-n-propyl isopropenyl ether, 2,3-dimethyl-4-bromo-n-butyl isopropenyl ether, 1-phenyl-3,5-dimethyl-6-chloro-n-hexyl isopropenyl ether, etc.; and styryl ethers such as chloromethyl alpha-phenylvinyl ether, 2-bromoethyl alpha-phenylvinyl ether, 3-iodo-n-propyl alpha-phenylvinyl ether, 4-bromo-n-butyl alphaphenylvinyl ether, 5-iodo-n-pentyl alpha-phenylvinyl ether, 6-chloro-n-hexyl alpha-phenylvinyl ether, 1-phenyl-2-chloroethyl alpha-phenylvinyl ether, 1-chloro-isopropyl alpha-phenylvinyl ether, 3-methyl-4-bromo-n-pentyl alpha-phenylvinyl ether, etc.

The alkali metal salts of primary ogranophosphines employed in the practice of this invention correspond to the general formula:

R is a hydrocarbon radical containing from 1–12 carbon atoms. M is an alkali metal radical, i.e., either a lithium, sodium, potassium, cesium or a rubidium radical. Therefore, in place of the sodio-phenylphosphine and lithio-secondarybutylphosphine employed in the examples may be substituted, for example, rubidio-ethylphosphine, sodio-ethylphosphine, sodio-isopropylphosphine, potassio- and lithio-n-butylphosphine, potassio-n-pentylphosphine, lithio - n - hexylphosphine, potassio - n - heptylphosphine, sodio-isooctylphosphine, potassio-decylphosphine, cesio-dodecylphosphine, sodio-cyclohexylphosphine, etc. with similar results. Such salts are readily prepared by reacting substantially equimolar proportions of the alkali metal and the appropriate primary organophosphine in a highly polar but inert solvent, e.g., liquid ammonia or sulfur dioxide, under an inert atmosphere. This type of synthesis is described in greater detail by C. H. S. Hitchcock and F. G. Mann in the Journal of Chemical Society, June 1958, (429), pp. 2081–2086.

The unsaturated secondary phosphine compounds comprising the subject of this invention correspond to the general formula:

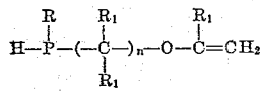

wherein R and $R_1$ are radicals as heretofore disclosed.

These compounds are prepared by reacting substantially equimolar proportions of an alkali metal salt of a primary organo-phosphine and an ethylenically unsaturated organic halide, of the class heretofore disclosed, under an inert, e.g., nitrogen, atmosphere. The reaction is effected in the presence of a solvent inert to the reactants. Suitable solvents include, for example, hydrocarbons such as benzene, toluene, xylene, hexane, cyclohexane, etc. or polar solvents such as ether, dioxane, tetrahydrofuran, liquid ammonia, liquid sulfur dioxide, etc. It is not necessary that both reactants be soluble in the solvent employed. However, it is preferred to employ a polar solvent, or a mixture of solvents, in which both reactants are soluble. The reaction temperature employed is usually dictated by practical requirements since the reaction proceeds efficiently at all temperatures. When liquid ammonia or sulfur dioxide are employed as the solvent, sub-zero temperatures below the boiling points of such are generally required. Super-atmospheric pressures may optionally be employed to raise the boiling point of the solvent employed.

The final reaction mixture is comprised of the desired ethylenically unsaturated secondary phosphine in admixture with solvent and residual reactants. Precipitated metal halide is also present. Recovery of the product is accomplished according to conventional techniques. The precipitated salt may be removed by, e.g., filtration or decantation. The solvent and residual reactants may be removed, for example, by distillation, either under vacuum or under an inert atmosphere. The ethylenically unsaturated secondary phosphines so produced are generally fluids. However, those of higher molecular weight, especially those containing two or more phenyl groups, may be crystalline or waxy solids.

These ethylenically unsaturated secondary phosphines are useful as antioxidants for incorporation into such resinous compositions as e.g., synthetic or natural rubber, styrene or substituted styrene polymers, vinyl ester polymers such as polyvinyl chloride, polyvinyl acetate, etc., acrylic polymers such as polyacrylonitrile, polymethylmethacrylate, etc. They may also be polymerized to form linear polyphosphines which are generally flame-resistant resins useful as flameproofing agents for paper, textiles, wood, etc. Such resins may also be molded, extruded or cast as sheets, films, tubing, etc. for, e.g., electrical insulation, fire barriers, surface coatings, etc.

*Example III*

Forty parts of the 2-(phenylphosphino)ethyl vinyl ether prepared in Example I are chargd to a 250 ml. glass flask equipped with a reflux condenser. The monomer is placed under a nitrogen atmosphere and is then irradiated with ultraviolet light for about 20 hours at room temperature. The resulting solid material is dissolved in 150 ml. of a 1:1 by weight mixture of acetone and benzene, which solution is then poured into an excess of absolute ether to precipitate the polymer. A hard, clear, glass-like polymer containing about 17.3% phosphorus by weight is obtained in about 95% yield. This polymer is soluble in acetone and methanol. Upon testing for flammability by holding the polymer in the flame of a Meeker burner until it ignites, the polymer is found to be self-extinguishing.

*Example IV*

A rectangular chip of ponderosa pine measuring about ¼" x 1" x 3" is immersed for 4 hours in 80 ml. of a 50% by weight solution of the 2-(phenylphosphino)-ethyl vinyl ether polymer obtained in Example III dissolved in benzene. The pine chip is then heated in an air oven at 80° C. for about 3 hours to remove all adsorbed solvent. Testing for flammability by holding the pine chip vertically in the flame of a Meeker burner until it ignites, the chip is found to be self-extinguishing.

It is obvious that many variations may be made in the products and processes set forth above without departing from the spirit and scope of this invention.

What is claimed is:

1. An ethylenically unsaturated secondary phosphine corresponding to the general formula:

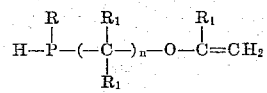

wherein $n$ is an integer of from 1 to 6, R is a hydrocarbon radical containing from 1 to 12 carbon atoms and each $R_1$ is a radical independently selected from the group consisting of hydrogen, methyl and phenyl radicals.

2. 2-(phenylphosphino)ethyl vinyl ether.

3. 4-(secondarybutylphosphino)-n-butyl isopropenyl ether.

4. A process for preparing an ethylenically unsaturated secondary phosphine corresponding to the general formula:

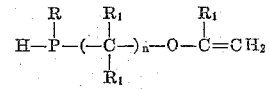

which comprises reacting substantially equimolar proportions of an alkali metal salt of a primary organophosphine corresponding to the general formula:

and an ethylenically unsaturated organic halide corresponding to the general formula:

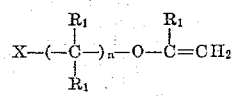

in a substantially oxygen-free reaction system with at least one of the reactants dissolved in an inert solvent; wherein, in each of the above formulae, M is an alkali metal radical, X is a halogen radical of the group consisting of bromine, chlorine and iodine, $n$ is an integer of from 1 to 6, R is a hydrocarbon radical containing from 1 to 12 carbon atoms and each $R_1$ is a radical independently selected from the group consisting of hydrogen, methyl and phenyl radicals.

No references cited.

UNITED STATES PATENT OFFICE
CERTIFICATE OF CORRECTION

Patent No. 3,011,000                  November 28, 1961

Albert Y. Garner

It is hereby certified that error appears in the above numbered patent requiring correction and that the said Letters Patent should read as corrected below.

Column 1, line 68, for "ben" read -- been --; column 2, line 17, for "2-chlorothyl" read -- 2-chloroethyl --; line 47, for "ogranophosphines" read -- organophosphines --.

Signed and sealed this 1st day of May 1962.

(SEAL)
Attest:

ERNEST W. SWIDER
Attesting Officer

DAVID L. LADD
Commissioner of Patents